No. 789,670. PATENTED MAY 9, 1905.
W. C. RARIG.
RAKE TOOTH.
APPLICATION FILED SEPT. 22, 1904.
2 SHEETS—SHEET 1.
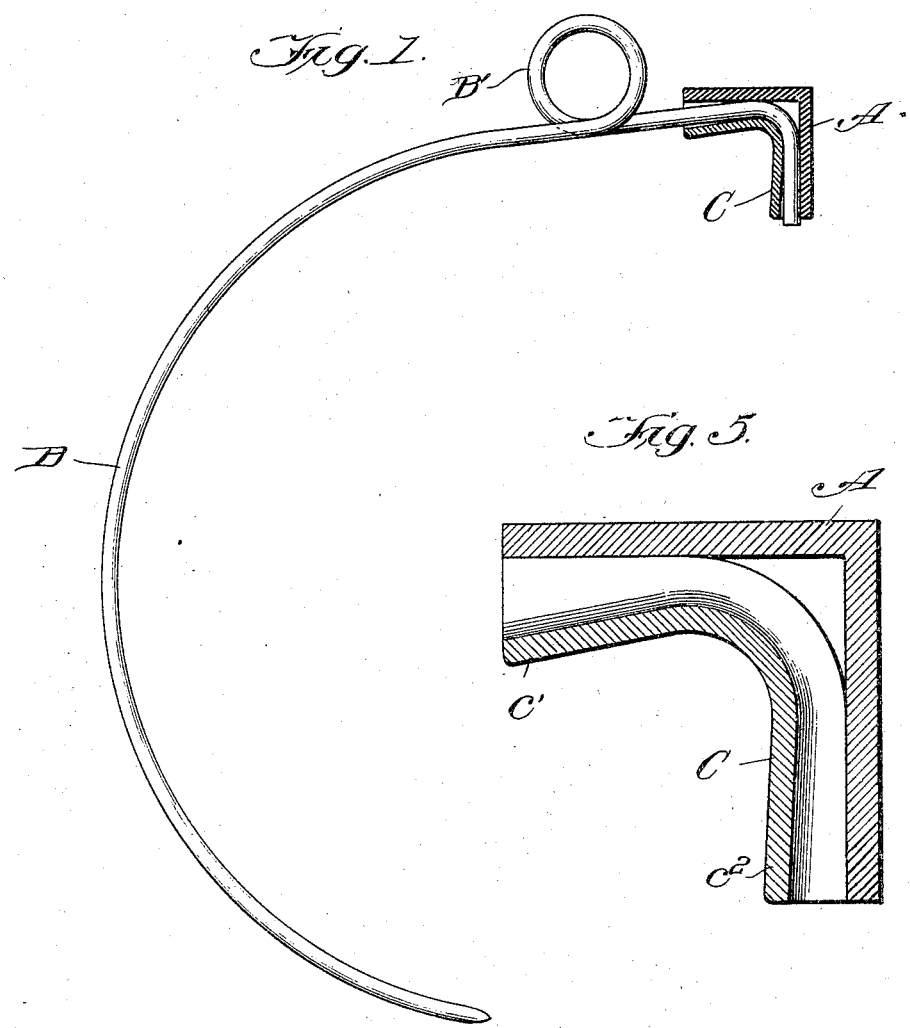

No. 789,670.                                                                  Patented May 9, 1905.

UNITED STATES PATENT OFFICE.

WELDEN C. RARIG, OF OGDEN, UTAH.

RAKE-TOOTH.

SPECIFICATION forming part of Letters Patent No. 789,670, dated May 9, 1905.

Application filed September 22, 1904. Serial No. 225,436.

*To all whom it may concern:*

Be it known that I, WELDEN C. RARIG, a citizen of the United States, residing at Ogden, county of Weber, State of Utah, have invented a certain new and useful Improvement in Rake-Teeth; and I declare the following to be a full, clear, and exact description of the invention, such as will enable others skilled in the art to which it pertains to make and use the same, reference being had to the accompanying drawings, which form a part of this specification.

My invention has for its object the production of a rake-tooth and holding device therefor which will act more or less as a cushion, and thus prevent the breakage of the teeth.

Figure 3:
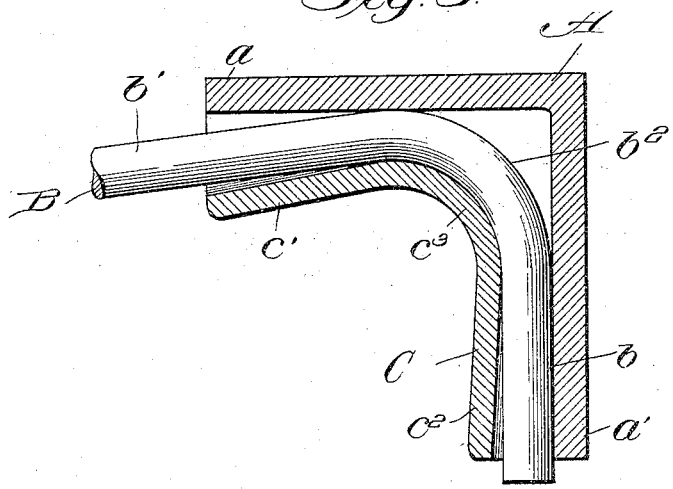
Figure 4:
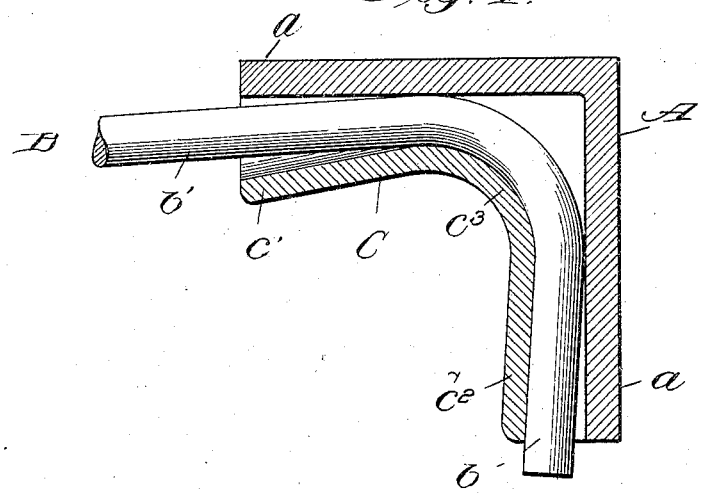

In the drawings, Figure 1 is a side elevation of a tooth with the holding device in section; Fig. 2, a plan view of the rake-head with a portion broken away to show the holding-block; Fig. 3, an enlarged sectional detail showing the position of parts when the tooth recoils; Fig. 4, a view similar to Fig. 3, showing the parts in their normal positions; and Fig. 5, an enlarged sectional view of the tooth-holding device.

In the drawings I have shown only a portion of the head and but a single tooth, it being understood that said head may be of any suitable construction and any desired length and that the bar may be designed to carry any desired number of teeth, my invention being directed to the shape of each tooth and to the means for engaging it to the head.

In carrying out the invention, A represents the head, carried and operated in any suitable and desirable manner. B represents the tooth. It may or may not be provided with the coil B', as desired. At the upper or engaged end the shank of the tooth has a portion $b$ bent at substantially right angles with the portion $b'$, the two being joined by the curved portion $b^2$.

C is a holding-block suitably engaged to the holder-bar by bolts $c$. This block is provided with the portion $c'$, which partially embraces the portion $b'$ of the tooth, with the portion $c^2$, which partially embraces the portion $b$ of the tooth, and with the portion $c^3$, which partially embraces the portion $b^2$ of the tooth. The block C is so shaped that the portion $c^3$ closely fits the portion $b^2$ of the tooth, while the portion $c^2$ is so shaped that the portion $b$ of the tooth will have more or less play between it and the head A, and the portion $c'$ is so shaped that the portion $b'$ of the tooth will have still more play between it and the head.

It is well known that a spring rake-tooth, like most springs, usually breaks on the recoil. Now by clamping the tooth at the curved portion $b^2$ and leaving both the portions $b$ and $b'$ free the tooth will when in operation assume the position shown in Fig. 4, with the portion $b$ bearing against the portion $c^2$ of the block and the portion $b'$ almost but not quite to a bearing against the portion $a$ of the head. A further strain on the tooth will flex the latter at the curved portion $b^2$ and bring the portion $b'$ against the head at $a$. Now on the recoil—that is, when the pressure on the free end of the tooth is relieved (see Fig. 3)—the shank will spring back, the portion $b$ will slide longitudinally slightly and strike the portion $a'$ of the head before the portion $b'$ strikes the portion $c'$ of the block and the blow of the recoil thus be cushioned.

The grooves in the holding-block which receive the bent portions of the teeth and secure the same to the tooth-head are of such a shape that the teeth are permitted to oscillate slightly relative to the tooth-head and also to slip slightly between the clamping-bar and head. The longitudinal movement of the teeth resulting from their slipping between the clamping-block and head permits the teeth to rise up and away from any obstruction with which the point thereof may come in contact, and thereby rendering the teeth less liable to be broken. The longitudinal slipping and oscillation between the teeth and the supporting-head serves to minimize the danger of the teeth being broken, not only by cushioning the teeth when they rebound after engagement with obstructions, but also by facilitating the passage of the points of the teeth over obstructions.

It is obvious that the form and size of the block C may be changed, so that instead of clamping several teeth, as shown, it would clamp a greater or lesser number of teeth, the essential feature being to provide the portion of the tooth at an angle to the balance, but in the same plane, and cause said portion to come to a bearing and cushion the tooth. It will be observed that by extending the bent portion at the upper end of the tooth in the same plane as the tooth a great elasticity results, which prevents the breaking of the tooth, inasmuch as the strain incident to flexing and recoil is assumed by the bent end and is rendered harmless owing to the resiliency of the tooth.

What I claim is—

1. In a rake-tooth the combination with a tooth-head, of a tooth comprising one end portion bent at an angle relatively to and in the same plane as the adjacent portion and a curved intermediate portion uniting the end and adjacent portions, and means engaging the curved portion of the tooth for securing the same to the tooth-head so as to admit a longitudinal and oscillatory movement of the tooth relatively to the head.

2. In a rake the combination with the head, of the tooth having one end portion turned to an angle with the adjacent portion, and in the same plane, said two portions joined by a curved portion and a holding-block engaged to the head and clamping the tooth at said curved portion so as to permit a longitudinal and oscillatory movement of the tooth relatively to the supporting-head.

3. In a rake the combination with a head, of the tooth having a portion turned at an angle to the balance, but in the same plane, said two portions joined by a curved portion, a holding-block having a curved portion to engage the curved portion of the tooth, said block having one extension which partially embraces the turned portion of the tooth but allows the latter to play between it and the head, and having another extension which partially embraces the other portion of the tooth but allows a play between it and the head, the play in the latter case being greater than in the former.

In testimony whereof I sign this specification in the presence of two witnesses.

WELDEN C. RARIG.

Witnesses:
GEO. L. WILKINSON,
HATTIE B. LEHMAN.